United States Patent
Mikhail et al.

(10) Patent No.: US 8,221,934 B2
(45) Date of Patent: Jul. 17, 2012

(54) METHOD TO ENHANCE THE DURABILITY OF CONDUCTIVE CARBON COATING OF PEM FUEL CELL BIPOLAR PLATES

(75) Inventors: Youssef M. Mikhail, Sterling Heights, MI (US); Mahmoud H. Abd Elhamid, Grosse Pointe Woods, MI (US); Gayatri Vyas Dadheech, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 375 days.

(21) Appl. No.: 12/472,697

(22) Filed: May 27, 2009

(65) Prior Publication Data
US 2010/0304267 A1    Dec. 2, 2010

(51) Int. Cl.
*H01M 4/90* (2006.01)

(52) U.S. Cl. ............... 429/485; 429/489; 429/494
(58) Field of Classification Search .......... 429/479–485, 429/488–489, 492–494, 528
See application file for complete search history.

(56) References Cited

U.S. PATENT DOCUMENTS

| 6,726,993 B2 | 4/2004 | Teer et al. |
| 2006/0188774 A1* | 8/2006 | Niu et al. ............... 429/44 |

* cited by examiner

*Primary Examiner* — Thanhha Pham
(74) *Attorney, Agent, or Firm* — Brooks Kushman P.C.

(57) ABSTRACT

A fuel cell component includes an electrode support material made with nanofiber materials of Titania and ionomer. A bipolar plate stainless steel substrate and a carbon-containing layer doped with a metal selected from the group consisting of platinum, iridium, ruthenium, gold, palladium, and combinations thereof.

9 Claims, 6 Drawing Sheets

METHOD TO ENHANCE THE DURABILITY OF CONDUCTIVE CARBON COATING OF PEM FUEL CELL BIPOLAR PLATES

BACKGROUND OF THE INVENTION

1. Field of the Invention

In at least one embodiment, the present invention is related to fuel cell components, and in particular, to flow field plates and catalyst layers in fuel cells.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates (i.e., flow field plates). The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate. Moreover, metallic bipolar plates are also subjected to corrosion during operation. The degradation mechanism includes the release of fluoride ions from the polymeric electrolyte. Metal dissolution of the bipolar plates typically results in release of iron, chromium and nickel ions in various oxidation states.

Currently, the catalyst layers used in fuel cells are fabricated from liquid compositions that include supported catalysts and ionomers. Although these methods work well, improvements are necessary because of fabrication limitations imposed by using a liquid composition. Therefore, novel materials are desired for electrodes, which can be used as support materials for catalysts that have high performance and durability.

Accordingly, there is a need for improved methodology for lowering the contact resistance at the surfaces of bipolar plates used in fuel cell applications and for fabricating catalyst layers.

SUMMARY OF THE INVENTION

The present invention solves one or more problems of the prior art by providing in at least one embodiment a fuel cell component. The fuel cell component includes a substrate and a carbon-containing layer doped with a metal selected from the group consisting of platinum, iridium, ruthenium, gold, palladium, and combinations thereof. Characteristically, the carbon containing layer has a ratio of $sp^2$ to $sp^3$ hybridized carbon in the carbon-containing film from about 0.8 to about 4. Advantageously, the carbon-containing layer exhibits improved corrosion resistance compared to carbon-containing layers that are doped with other metals such as titanium and chromium.

In another embodiment, a catalyst layer for fuel cell applications is provided. The catalyst layer includes a carbon-containing composition and an ionomeric composition. The carbon-containing composition is doped with a metal selected from the group consisting of platinum, iridium, ruthenium, gold, palladium, and combinations thereof.

In another embodiment, a catalyst support material is formulated. The catalyst support includes a mixed array of nanotubes of titania and ionomeric material in defined compositions in intimate contact.

In still another embodiment, a flow field plate for fuel cell applications is provided. The fuel cell plate includes a metal plate having a first surface and a second surface. The first surface defines a plurality of channels for directing flow of a first gaseous composition. The flow field plate also includes a carbon-containing layer disposed over at least a portion of the metal plate. The carbon-containing layer is doped with a metal selected from the group consisting of platinum, iridium, ruthenium, gold, palladium, and combinations thereof. Moreover, the carbon containing layer has a ratio of $sp^2$ to $sp^3$ hybridized carbon in the carbon-containing film from about 0.8 to about 4.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
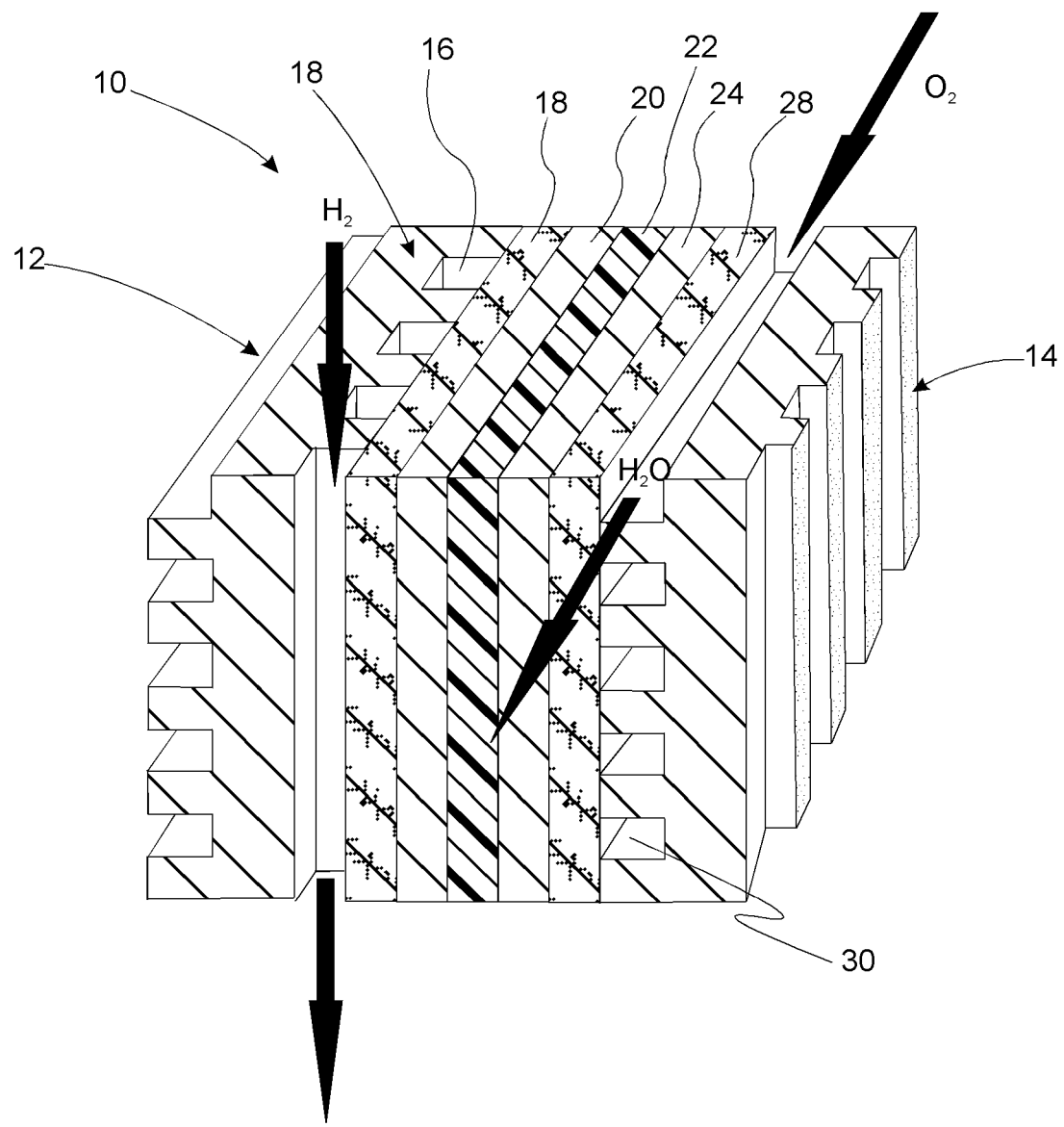
FIG. 1 is a perspective view of a fuel cell incorporating the bipolar plates of an embodiment of the present invention.

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

The term "nanotubes" is used to define the tubes which are 20 to 500 nm in diameter and 50 to 1000 nm long.

The term titania nanotubes refers to nanotubes of titanium dioxide which are 20 to 100 nm in diameter and 50 to 500 nm long.

The term Nafion nanotubes refers to nanotubes of Nafion which are 20 to 500 nm in diameter and 50 to 1000 nm long.

The term "non-crystalline carbon layer" as used herein means a layer comprising at least 80 weight percent carbon with less than 10 weight percent of the layer being crystalline. Typically, non-crystalline carbon layers are at least 90 weight percent carbon with less than 5 weight percent of the layer being crystalline. In a refinement, non-crystalline carbon layers are substantially amorphous carbon.

In an embodiment of the present invention, a carbon-containing layer that is useful for fuel cell applications is provided. The carbon-containing layer is doped in order to increase the electrical conductivity. Specifically, the carbon-containing layer is doped with Pt, Ir, Pd, Rh, Au, or Ru. 0.1 to 10 wt %. Advantageously, the carbon-containing layer exhibits improved corrosion resistance compared to carbon-containing layers that are doped with other metals such as titanium or chromium. In a variation, the carbon-containing layer is characterized by the ratio of $sp^2$ to $sp^3$ hybridized carbon. In one refinement, the ratio (i.e., molar ratio) of $sp^2$ to $sp^3$ hybridized carbon in the carbon-containing film is from about 0.8 to about 4. In another refinement, the ratio of $sp^2$ to $sp^3$ hybridized carbon in the carbon-containing film is from about 1 to about 3. In still another refinement, the ratio of $sp^2$ to $sp^3$ hybridized carbon in the carbon-containing film is from about 1.1[??] to about 2. The ratio of $sp^2$ to $sp^3$ carbon may be determined by a number of analytical techniques such as Raman Spectroscopy, C-13 NMR, and the like. In a further refinement, the electrical conductivity of carbon-containing layer is such that the contact resistance of fuel cell 10 is less than about 20 mohm-$cm^2$.

In another embodiment of the present invention, a fuel cell component comprising an electrode having a non-carbon support material comprising nanotubes of titania and an ion conducting ionomer is provided. The nanotubes of titania are typically from about 20 to about 100 nm in diameter and from about 50 to about 500 nm in length. Similarly, the nanotubes of ion conducting ionomer are from about 20 to about 500 nm in diameter and from about 50 to about 1000 nm in length. In a variation of the present invention, the nanotubes of titania and ion conducting ionomer are interdispersed. In a refinement, the nanotubes of titania and ion conducting ionomer are interdispersed with the amount of titania nanotubes being from about 30 to about 70% of the total number of nanotubes. In another refinement, the nanotubes of titania and ion conducting ionomer are interdispersed with the amount of ion conducting nanotubes being from about 30 to about 70% of the total number of nanotubes. Suitable ion conducting materials from which the ion conducting nanotubes are made include, but are not limited to, Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, polyester, and combinations thereof.

In a variation, Titania nanotubes are made by impregnating alumina templates that have columnar structure, with reactive organometallic titanium compounds such as titanium isopropoxide or ethoxide dissolved in a solvent such as hexane. The solvent is allowed to dry out leaving behind the reactive titanium compound inside the template, which spontaneously reacts with water to yield titanium oxide which takes the shape of the template. The template is later removed using selective dissolution of alumina in sodium hydroxide leaving behind Titania nanotubes. Nafion nanotubes are made using a similar process in which a Nafion is used to impregnate the template. The Nafion will then be allowed to dry inside the template. Subsequently, the template is dissolved in sodium hydroxide or hydrofluoric acid leaving behind the Nafion nanotubes.

In another variation, Titania or the Nafion are deposited inside the templates using plasma enhanced CVD process, magnetron sputter deposition process, pulsed laser deposition process (PLD) or atomic layer deposition (ALD) processes. Titanium precursors can be chosen from inorganic or organic titanium derivatives such as titanium tetrachloride. Nafion is deposited from a 10% Nafion solution. The temperature regime in which the Ti nanotube growth is obtained is from 100° C. to 450° C. The temperature range for preparing Nafion nanotubes is from 100 to 300° C. Plasma enhanced CVD will typically use a microwave plasma source supply at 256 Hz. Ti nanotubes are advantageously deposited from $TiCl_4$ precursor in the range of 350° C. to 450° C.

The carbon-containing films of the present embodiment are advantageous used in a number of fuel cell components. With reference to FIG. 1, a fuel cell comprising a metallic flow field plate is provided. Fuel cell 10 includes flow field plates 12, 14. Flow field plate 12 includes a plurality of channels 16 for introducing a first gas into fuel cell 10. Typically, this first gas comprises oxygen. Diffusion layer 18 is disposed over flow field plate 12. First catalyst layer 20 is disposed over diffusion layer 18. Fuel cell 10 further includes ion conductor layer 22, which is disposed over first catalyst layer 20. Second catalyst layer 24 is disposed over ion conductor layer 22. Fuel cell 10 also includes flow field plate 14 with gas diffusion layer 28 interposed between second catalyst layer 24 and flow field plate 14. Flow field plate 14 includes a plurality of channels 30. In a refinement, flow field plates 12, 14 are made from a metal such as stainless steel. In one variation, the carbon-containing films set forth above are coated onto a surface of one or both of flow field plates 12, 14. In another refinement, the carbon-containing films are incorporated into one or both of first catalyst layer 20 and second catalyst layer 24.

In a variation of the present embodiment, ion conducting layer comprises an ionomer. Suitable ionomers include, but are not limited to, Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, polyester, and combinations thereof. In a refinement, the ionomer comprises nanotubes or filaments.

Still referring to FIG. 1, the electrode having a non-carbon support material comprising nanotubes of titania and an ion conducting ionomer may be used for either or both of first catalyst layer 20 and/or second catalyst layer 24. Typically, this electrode contacts a substrate such as ion conducting polymeric layer (e.g., ion conductor layer 22).

Figure 2A:
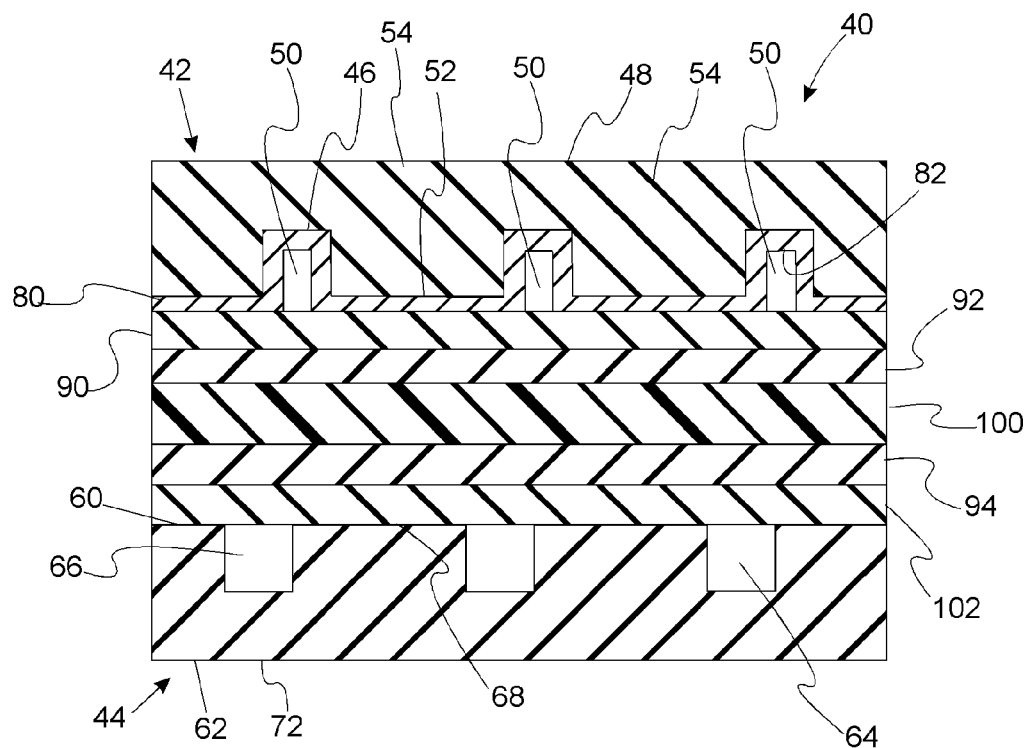
FIG. 2A provides a cross-sectional view of a fuel cell incorporating an exemplary embodiment of a carbon-containing layer on a unipolar plate.
Figure 2B:
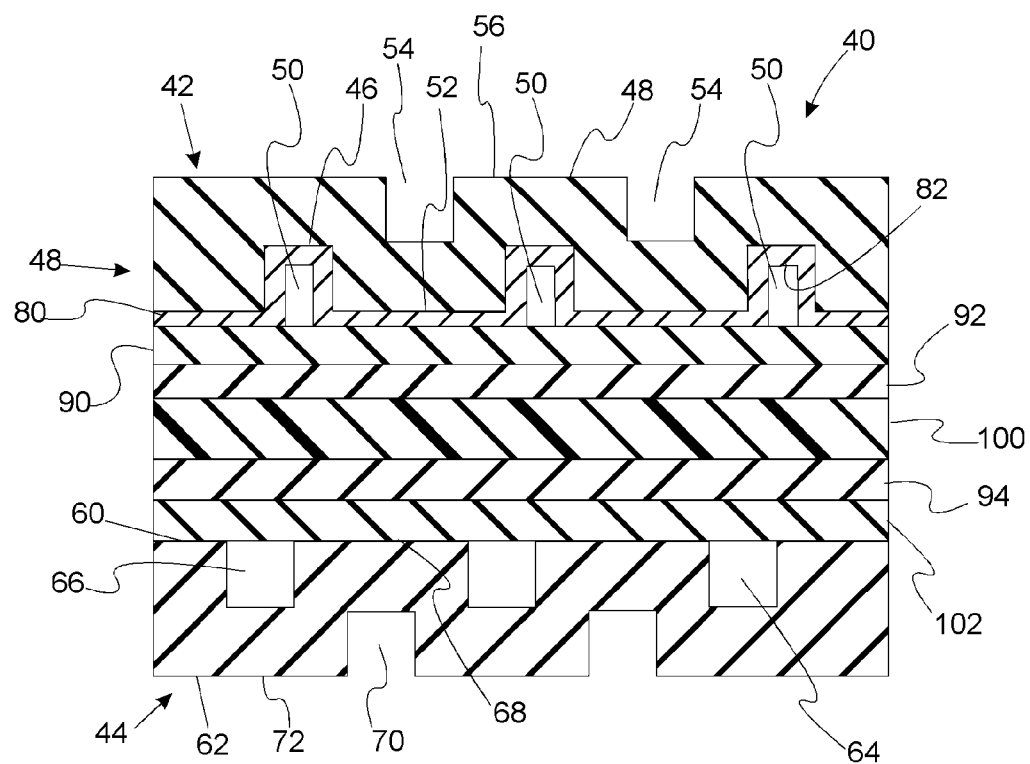
FIG. 2B provides a cross-sectional view of a fuel cell incorporating an exemplary embodiment of a carbon-containing layer on a bipolar plate.

With reference to FIGS. 2A and 2B, schematic cross sections of fuel cells incorporating the flow field plates coated with the carbon-containing films set forth above are provided. Fuel cell 40 includes flow field plates 42, 44. Flow field plate 42 includes surface 46 and surface 48. Surface 46 defines channels 50 and lands 52. FIG. 2A provides a depiction in which flow field plate 42 is a unipolar plate and flow field plate 44 is bipolar. FIG. 2B provides a depiction in which flow field plates 42, 44 are both bipolar plate. In this variation, surface 48 defines channels 54 and lands 56. Similarly, flow field 44 includes surface 60 and surface 62. Surface 60 defines channels 66 and lands 68. FIG. 2A provides a depiction in which flow field plate 44 is a unipolar plate. FIG. 2B provides a depiction in which surface 62 defines channels 70 and lands 72.

Still referring to FIGS. 2A and 2B, carbon-containing layer 80 is disposed over and contacts surface 46. In a variation, carbon-containing layer 80 includes surface 82 having a contact angle with water less than about 30 degrees. In one refinement, carbon-containing layer 80 has a thickness from about 10-2000 nm Still referring to FIGS. 2A and 2B, fuel cell 40 further includes gas diffusion layer 90 and catalyst layers 92, 94. Polymeric ion conductive membrane 100 is interposed between catalyst layers 92, 94. Finally, fuel cell 40 also includes gas diffusion layer 102 positioned between catalyst layer 94 and flow field plate 44.

In a variation of the present invention, a first gas is introduced into channels 50 and a second gas is introduced into channels 66. Channels 50 direct the flow of the first gas and channels 66 direct the flow of the second gas. In a typical fuel cell application, an oxygen-containing gas is introduced into channels 50 and a fuel is introduced into channels 66. Examples of useful oxygen containing gases include molecular oxygen (e.g., air). Examples of useful fuels include, but are not limited to, hydrogen. When an oxygen-containing gas is introduced into channels 50, water is usually produced as a by-product which must be removed via channels 50. In this variation, catalyst layer 92 is a cathode catalyst layer and catalyst layer 94 is an anode catalyst layer.

Figure 3:
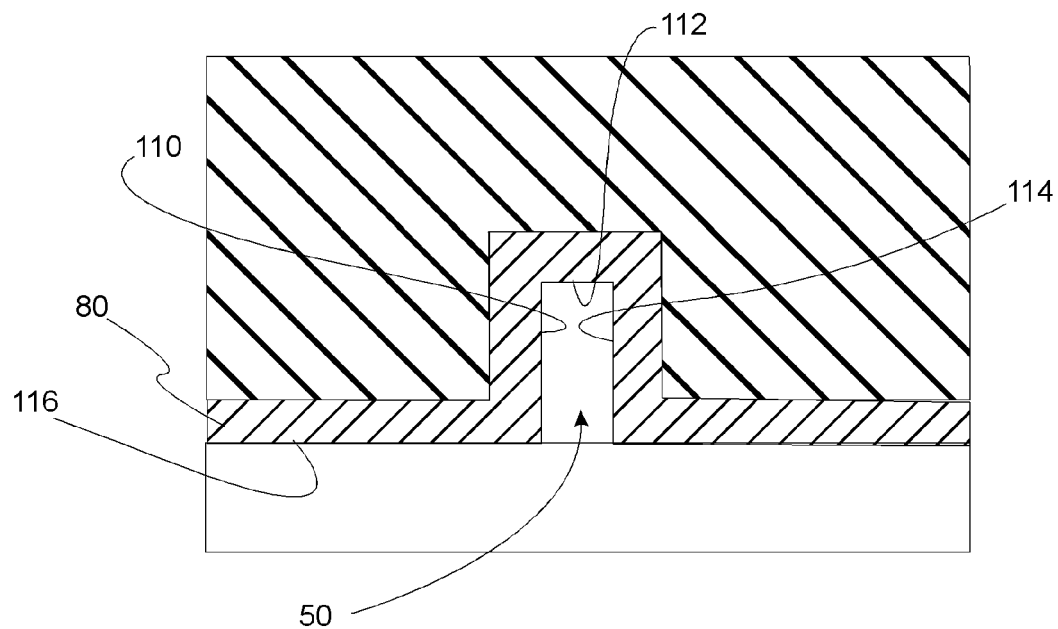
FIG. 3 provides a cross-sectional view of a bipolar plate channel coated with a carbon-containing layer.

With reference to FIG. 3, a magnified cross-sectional view of channels 50 is provided. Surfaces 110, 112, 114 of carbon-containing layer 80 provide exposed surfaces in channels 50. Advantageously, these surfaces of carbon-containing layer 80 are hydrophilic, having a contact angle with water less than about 30 degrees. In another refinement, the contact angle is less than about 20 degrees. The hydrophilic nature of carbon-containing layer 80 prevents water from agglomerating in channels 50.

In a variation of the present embodiment, the surface of the carbon-containing film is activated by a plasma (e.g., RF plasma, DC plasma, microwave plasma, hot filament plasma, open air plasma, and the like). In a refinement of the present embodiment, the hydrophilicity of carbon-containing layer 80 is improved by activating surface 82 of FIGS. 2A and 2B (i.e., surfaces 110, 112, 114, 116). In one refinement, the activation is accomplished by exposing the carbon-containing layers to a reactive oxygen plasma which would activate the carbon-containing layers by breaking bonds and forming hydroxyl, carboxyl and aldehyde functional groups. In one refinement, the post treatment is accomplished by exposing the carbon-containing layers to reactive gases nitrogen, nitrous oxide, nitrogen dioxide, ammonia or mixture thereof, which activate the carbon-containing layers by breaking bonds and forming nitrogen-based derivatives like amines, amide, diazo functional groups. Accordingly, the post-treatment activation is able to increase the amounts of nitrogen and/or oxygen in carbon-containing layer 80. In a further refinement, the amounts of nitrogen and oxygen are in regions within several nanometers of surface 82. In another refinement, the activation of surface 82 results in an increase in porosity as compared to the surface prior to activation. In a further refinement, surface 82 includes regions in which there are at least 10 pores per $m^2$ of surface area. Moreover, surface 82 includes on average at least 5 pores per $micron^2$ of surface area. The number of pores per $m^2$ is calculated by counting the number of pores in a given area observed in a scanning electron micrograph.

Figure 4:
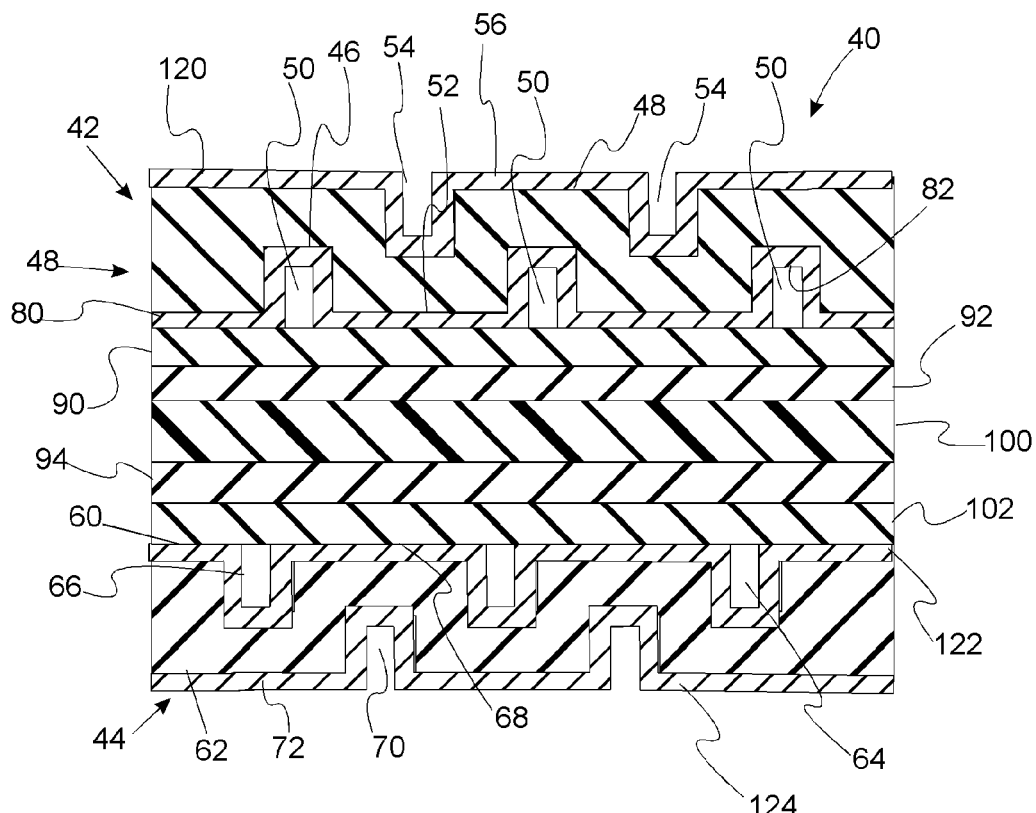
FIG. 4 provides a cross-sectional view of a fuel cell incorporating another exemplary embodiment of a carbon-containing layer on a bipolar plate.

With reference to FIG. 4, a schematic cross section illustrating additional surfaces of fuel cell bipolar plates coated with carbon-containing layers is provided. In this variation, one or more of surfaces 46, 48, 60, and 62 are coated with a carbon-containing layer. As set forth above, in connection with the description of FIGS. 2A and 2B, fuel cell 40 includes flow field plates 42, 44. Bipolar plate 42 includes surface 46 and surface 48. Surface 46 defines channels 50 and lands 52. Surface 48 defines channels 54 and lands 56. Similarly, bipolar plate 44 includes surface 60 and surface 62. Surface 60 defines channels 66 and lands 68. Surface 62 defines channels 70 and lands 72.

Still referring to FIG. 4, carbon-containing layer 80 is disposed over and contacts surface 46. In a variation, carbon-containing layer 80 includes surface 82 having a contact angle with water less than about 30 degrees. Similarly, carbon-containing layer 120 is disposed over and contacts surface 48, carbon-containing layer 122 is disposed over and contacts surface 60, and carbon-containing layer 124 is disposed over and contacts surface 62. Fuel cell 40 further includes gas diffusion layer 90 and catalyst layers 92, 94. Polymeric ion conductive membrane 100 is interposed between catalyst layers 92, 94. Finally, fuel cell 40 also includes gas diffusion layer 102 positioned between catalyst layer 94 and bipolar plate 44. The details of carbon-containing layers 80, 120, 122, 124 are set forth above in connection with the description of FIGS. 2A and 2B.

In another embodiment of the present invention, a carbon-containing layer useful as a fuel cell catalyst layer is provided. The carbon-containing layer includes a carbon-containing composition doped with an unreactive precious metal or platinum group metal (e.g., Pt, Ir, Pd, Au, or Ru). The carbon-containing layer also includes an ion conducting polymer (e.g., ionomer) to provide ion conductivity to the carbon-containing layer. In a refinement, the ion conducting polymer includes a component selected from the group consisting of Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, polyester, and combinations thereof. In another refinement, the ion conducting polymer comprises ionomeric nanotube or filament (e.g., Nafion nanotubes or filaments).

Figure 5:
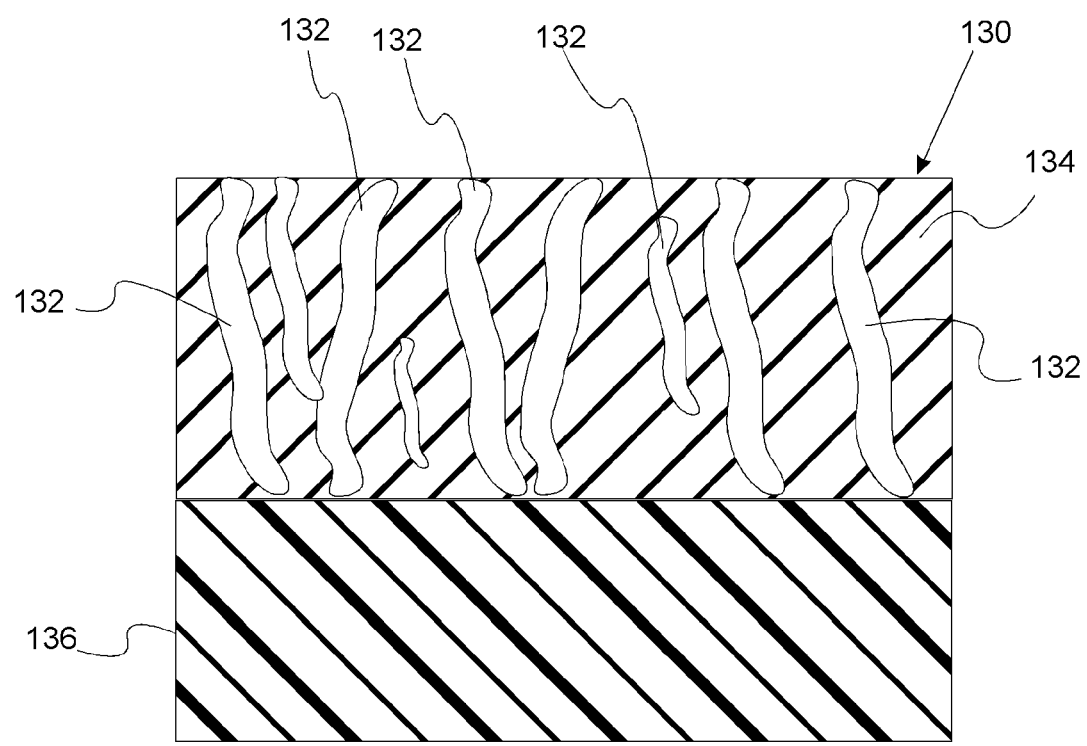
FIG. 5 provides a schematic illustration of a carbon-containing layer useful as a fuel cell catalyst.

With reference to FIG. 5, a schematic illustration of a carbon-containing layer useful as a fuel cell catalyst is provided. Carbon-containing layer 130 includes ionomeric regions 132 dispersed within carbon composition 134. Typically, carbon-containing layer 130 is from about 12 to about 25 microns. The ionomeric regions are typically about 30 to about 50 wt % of the total weight of the ionomeric regions. In the variation depicted in FIG. 5, carbon-containing layer 130 coats substrate 136. In one refinement, substrate 136 is a gas diffusion layer. In another refinement, substrate 136 is an ion conducting polymer layer. In this embodiment, Nafion nanotubes are particularly useful for forming ionomeric regions 132 since they allow channels for ion conduction across carbon-containing layer 130. In another refinement, the ionomeric regions include hydrophobic and hydrophilic domains. These domains occur in polymer such as Nafion which have a polymer backbone that is hydrophobic and sulfonated side groups that are hydrophilic. In fuel cell applications, the hydrophobic regions tend to dominate at positions closer to the polymeric ion conducting layer (e.g., membrane).

Figure 6:
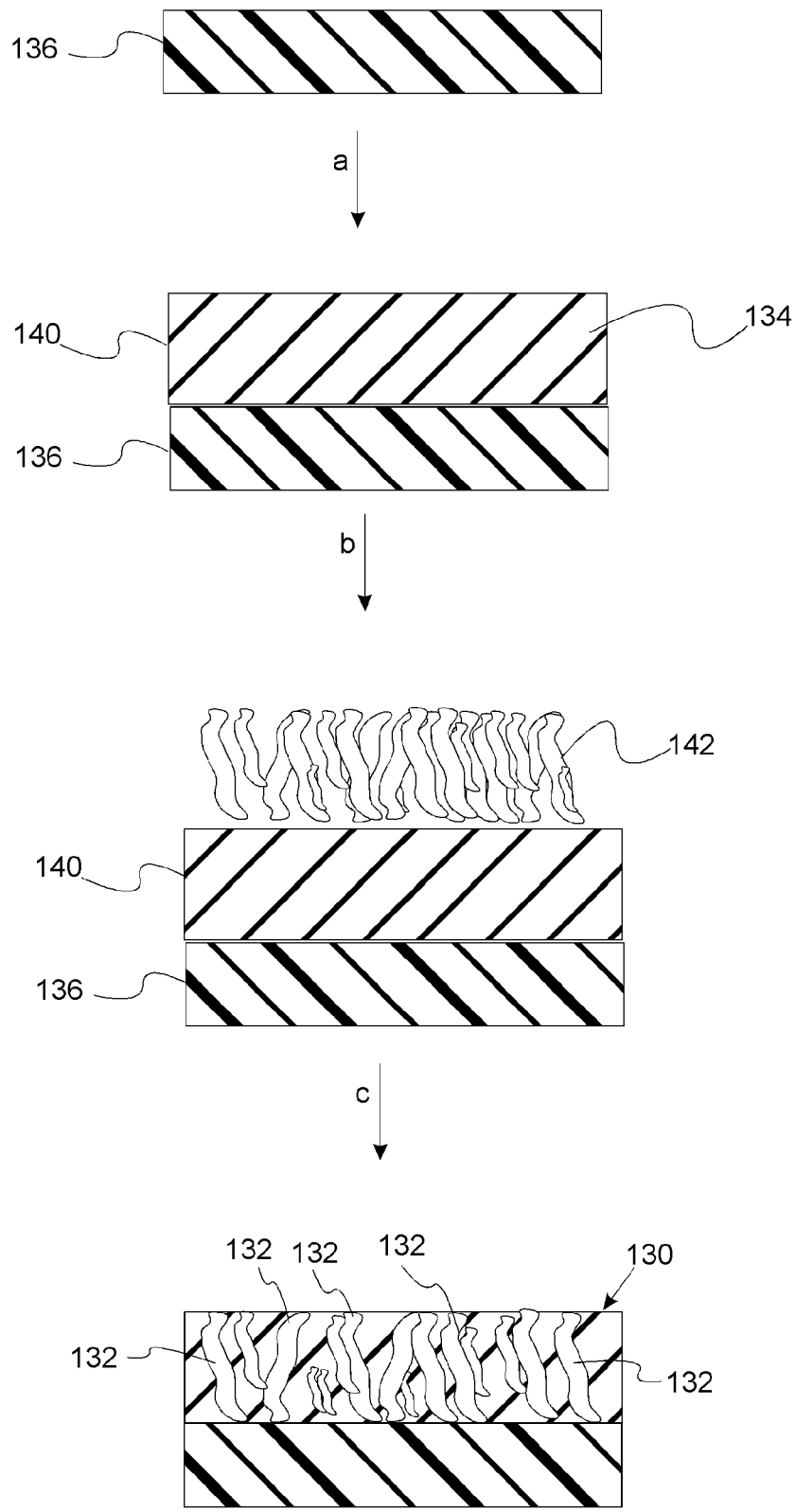
FIG. 6 provides a flowchart illustrating an exemplary method for making a bipolar plate coated with a carbon-containing layer.

With reference to FIG. 6, a pictorial flowchart showing the preparation of the carbon-containing layer depicted in FIG. 5 is provided. Substrate 136 is coated in step a) with first carbon-containing layer 140. Carbon containing composition 134 is doped with a metal selected from the groups consisting of platinum, iridium, ruthenium, gold, palladium, and combinations thereof. Typically, this carbon-containing composition is deposited by a physical deposition technique such as sputtering. In step b), ionomer layer 142 is coated onto first carbon-containing layer 140. In step c), ionomer layer 142 is hot pressed into first carbon-containing layer 140 to form carbon-containing layer 130 which is useful as a fuel cell catalyst layer.

In a variation of the present embodiment, the carbon-containing layers set forth above are formed from carbon layers that are deposited by sputtering. In one refinement, the carbon layers are deposited using a closed field unbalanced magnetron system. For this purpose, a variation of the method and apparatus is set forth in U.S. Pat. No. 6,726,993 (the '993 patent). The entire disclosure of the '993 patent is hereby incorporated by reference in its entirety.

Figure 7:
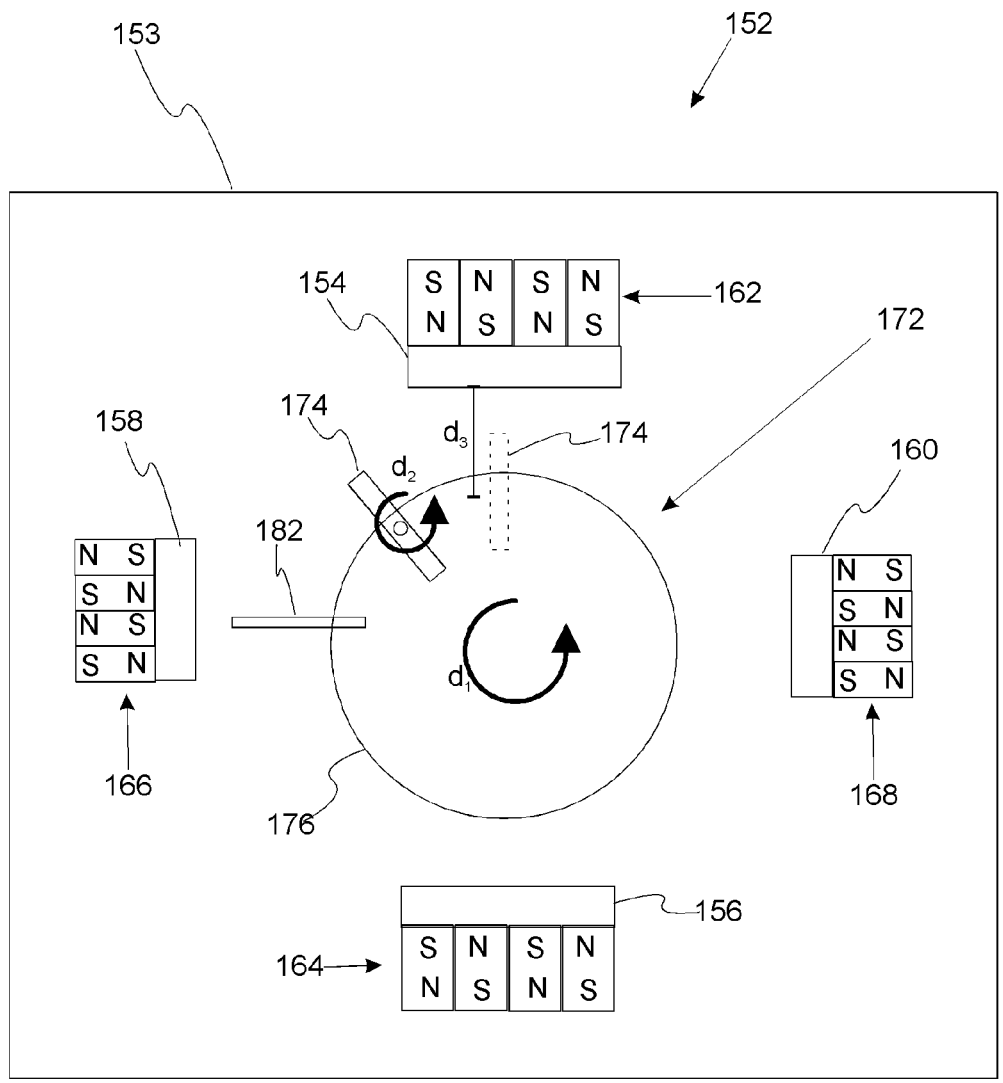
FIG. 7 is a schematic illustration of a sputtering system used to deposit carbon-containing layers.

With reference to FIG. 7, a refinement of a sputtering deposition system for depositing the carbon-containing layers set forth above is provided. A useful sputtering system is the Teer UDP 650 system. FIG. 7 provides a schematic top view of the sputtering system. Sputtering system 152 includes deposition chamber 153 and sputtering targets 154, 156, 158, 160 which are proximate to magnet sets 162, 164, 166, 168. A magnetic field generated between the targets 154, 156, 158, 160 is characterized with field lines extending between the magnetrons forming a closed field. The closed field forms a barrier, which prevents the escape of electrons within plasma containing area 172. Moreover, this configuration promotes ionization in the space within the closed field with increased ion bombardment intensity. High ion current density is thereby achieved. Substrate 174 (i.e., metal plate 12) is held on platform 176, which rotates along direction $d_1$. Flipper 182 causes rotation of substrate 174 about direction $d_2$ during a cycle of platform 176. In one example, sputtering targets 154, 156 are carbon targets while sputtering targets 158, 160 optionally include the metal dopants set forth above. Moreover, in this example, magnet sets 162, 164 provide a more intense magnetic field than magnet sets 166, 168. This magnetic imbalance allows for less dopant to be sputtered than carbon. When system 152 is utilized, pre-conditioning step a) is advantageously performed by ion etching within deposition chamber 153. In a refinement, the deposited carbon layer is removed by a plasma formed in deposition chamber 153.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell component comprising:
   an electrode having a non-carbon support material comprising nanotubes of titania and nanotubes of an ion conducting ionomer.

2. The fuel cell component of claim 1 wherein the nanotubes of titania are 20 to 100 nm in diameter and 50 to 500 nm in length.

3. The fuel cell component of claim 1 wherein the nanotubes of an ion conducting ionomer are 20 to 500 nm in diameter and 50 to 1000 nm in length.

4. The fuel cell component of claim 1 wherein the nanotubes of titania and the nanotubes of an ion conducting ionomer are interdispersed.

5. The fuel cell component of claim 1 wherein the nanotubes of titania and the nanotubes of an ion conducting ionomer are interdispersed, the nanotubes comprising from about 20 to about 70% titania nanotubes.

6. The fuel cell component of claim 1 wherein the nanotubes of titania and the nanotubes of an ion conducting ionomer are interdispersed, the nanotubes comprising from about 20 to about 70% nanotubes the nanotubes of an ion conducting isomer.

7. The fuel cell component of claim 1 wherein the nanotubes of titania and the nanotubes of an ion conducting ionomer contact a substrate.

8. The fuel cell component of claim 7 wherein the substrate is an ion conducting polymeric layer.

9. The fuel cell component of claim 1 wherein the ionomer comprises a component selected from the group consisting of Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, polyester, and combinations thereof.

\* \* \* \* \*